United States Patent [19]
Smith et al.

[11] Patent Number: 5,116,142
[45] Date of Patent: May 26, 1992

[54] ROLLER OR WHEEL ASSEMBLY FOR PATIO DOORS

[75] Inventors: John C. Smith, Letchworth; Patrick E. Christmas, Henlow, both of United Kingdom

[73] Assignee: Schlegal (UK) Holdings Limited, Leeds, England

[21] Appl. No.: 724,491

[22] Filed: Jun. 21, 1991

Related U.S. Application Data

[63] Continuation of Ser. No. 506,684, Apr. 9, 1990, abandoned.

[30] Foreign Application Priority Data

May 18, 1989 [GB] United Kingdom ............... 8911400

[51] Int. Cl.⁵ ............................................. F16C 29/04
[52] U.S. Cl. .......................................... 384/55; 384/58
[58] Field of Search ............... 384/55, 48, 547, 58, 384/588, 515, 499

[56] References Cited

U.S. PATENT DOCUMENTS

| | | | |
|---|---|---|---|
| 665,643 | 1/1901 | McCabe | 384/547 |
| 4,581,799 | 4/1986 | Bessinger | 384/449 |

FOREIGN PATENT DOCUMENTS

| | | |
|---|---|---|
| 344995 | 3/1931 | United Kingdom . |
| 621857 | 4/1949 | United Kingdom . |
| 2024121 | 1/1980 | United Kingdom . |
| 2188685 | 10/1987 | United Kingdom . |

Primary Examiner—Lenard A. Footland
Attorney, Agent, or Firm—Cumpston & Shaw

[57] ABSTRACT

The invention provides a wheel or roller assembly for a patio door or the like comprising a carriage having two parallel spaced side plates, and a wheel rotatably mounted within the carriage by means of a pair of spaced ball- or roller-bearing sets, one at or adjacent each side thereof.

In a preferred embodiment, the inner and outer races of a pair of ball bearing sets are provided by inturned arcuate portions of the side plates and interior edge regions, for example lined arcuate grooves, of the wheel respectively.

7 Claims, 1 Drawing Sheet

ROLLER OR WHEEL ASSEMBLY FOR PATIO DOORS

This is a continuation of copending application Ser. No. 07/506,684 filed on Apr. 9, 1990 abandoned.

This invention relates to a roller or wheel assembly for a patio door or the like. It will be appreciated, however, that the roller or wheel assembly could have many other uses but it has been specifically designed for rolling or sliding patio doors.

Traditionally, wheel or roller assemblies for patio doors incorporate a carriage having a pair of spaced side plates held in their spaced relationship by a tubular spring pin, there being a two-part hardened steel inner ball race supported on the tubular spring pin by a tubular rivet which holds the two-part inner race together, the inner race having a semi-circular annular track thereon within which the ball bearings locate and there being a steel wheel rotatably supported on the ball bearings and providing the outer race for the ball bearings. The inner ball race must necessarily be formed of two parts so that it is possible to assemble the wheel, ball bearings and inner race portions together to form a wheel sub-assembly, the component parts being maintained in their assembled relationship by means of the tubular rivet. To form the wheel assembly, the sub-assembly is located between the two side plates of the carriage which are then locked together using the tubular spring pin.

While the wheel assembly described above has proved commercially successful, it is nevertheless quite difficult and expensive to assemble in view of the number of parts and because the sub-assembly must first be manufactured. In spite of its commercial success, the known wheel assembly has the disadvantage that, after continuous use, it becomes worn, with the result that the wheel can float from side to side within its carriage, thus impairing the performance of the sliding patio door to which it is fitted. Furthermore, such wheel assemblies have traditionally incorporated hardened steel wheels which are relatively expensive.

The present invention seeks to provide an improved construction of wheel or roller assembly for patio doors and the like which does not suffer from the disadvantages associated with known wheel assemblies.

According to the present invention, we provide a wheel or roller assembly for a sliding fenestration comprising two parallel side plates defining a carriage, a wheel located at least partly between the side plates and two spaced ball or roller bearing sets, one at or adjacent each side of the wheel, rotatably supporting the wheel within the carriage, said side plates each having a side wall, an annular inturned portion and a central web portion, and an annular inturned portion and part of the side wall of each side plate together defining an inner race for a respective one of said bearing sets, means connecting together said central web portions and wherein said wheel has two inner annular edge regions, one on each side thereof to receive one of said bearing sets, and defining an outer race for its bearing sets.

Preferably, each bearing set is a set of ball bearings and each side plate includes an arcuate portion connecting the inturned portion to its side wall to provide the inner race for its respective ball bearings set, and to confine the ball bearings laterally and prevent them from moving outwards.

Preferably, the wheel includes a central region which extends at least partly between the two bearing sets and confines the ball bearings laterally, preventing them from moving inwards, and an internal annular ledge extends inwardly from each side face thereof and forms part of said annular edge region, and two arcuate regions join the respective internal ledges to the central region.

Preferably, the wheel is molded from a synthetic resin.

Preferably, two annular lining shells are inserted, one in each of the outer races of the wheel.

Preferably, the side plates each include a central web portion, the web portions abutting each other and the means connecting the two side plates together comprises a rivet, which may be tubular, and passes through the web portions. Preferably, the wheel includes a metal tire molded into the outer peripheral surface of the wheel.

The invention is now described by way of example with reference to the accompanying drawings, in which.

Figure 1:
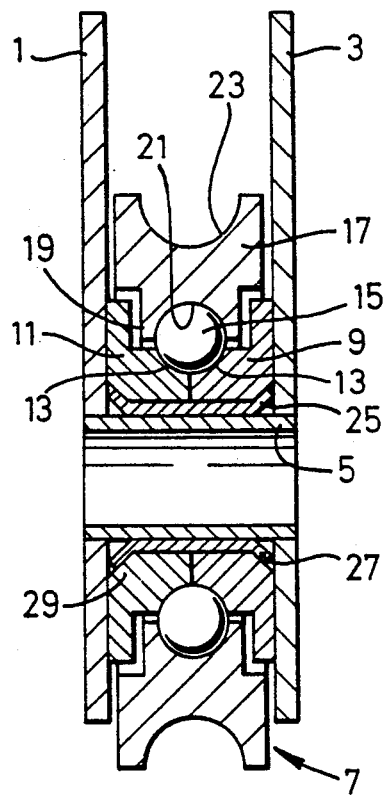
FIG. 1 shows in cross-section a prior art patio door roller.

Referring to the drawings, the prior art wheel assembly comprises a carriage formed of two parallel spaced apart side plates 1 and 3 held in their spaced relationship by a tubular spring pin 5. A wheel sub-assembly shown generally at 7 is supported on the carriage and comprises two annular hardened steel inner ball race parts 9 and 11, one of which is a mirror image of the other, and each of which is of generally L-shaped cross-section, with the horizontal arms of the L abutting each other and the upright arms of the L lying within and against the respective carriage side plates 1 and 3. The upper free corner of each horizontal arm of the L is provided with a part-circular race portion 13 which together with the race portion of its adjacent inner race part provides a semi-circular inner ball race for a set of ball bearings 15. A steel wheel 17 of annular construction has an interior portion 19 of reduced width which locates between the upstanding arms of the two race parts 9 and 11 and has a semi-circular race on its inner periphery, the outer face of the wheel being suitably profiled as at 23, e.g. to run on a guide rail on a patio door frame.

The wheel assembly is completed by a tubular rivet 25 the outer peripheral portions of which are out-turned as shown at 27 to embrace chamfered corner portions 29 of the inner race parts 9 and 11 to hold the sub-assembly together.

The above-described wheel assembly is relatively difficult to manufacture because of the need first to put together the sub-assembly 7 and after extensive use the inner and outer ball bearing races can wear and this results in side to side movement of the wheel 23 within its carriage. This means that the patio door or other article supported on the wheel assembly can move bodily within its frame and this results in the weatherseals associated with the door or the like not functioning as well as they should. Furthermore, once bodily movement of the door starts to occur, the door is no longer so secure since it is easier for a screwdriver or jimmy to be inserted between the door and its frame and for the door to be forced open.

Figure 2:
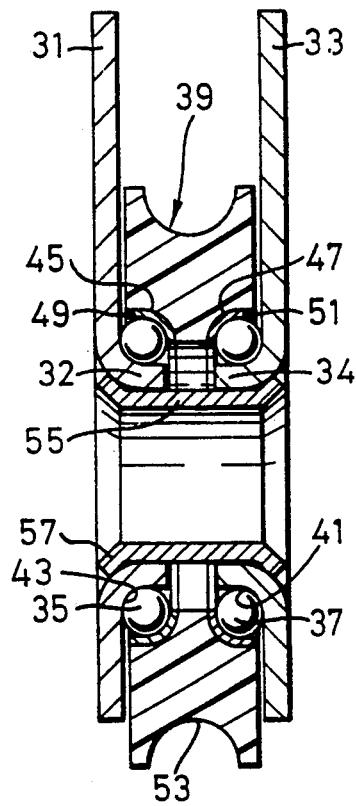
FIG. 2 shows in cross-section a patio door roller constructed in accordance with the invention.
Figure 3:
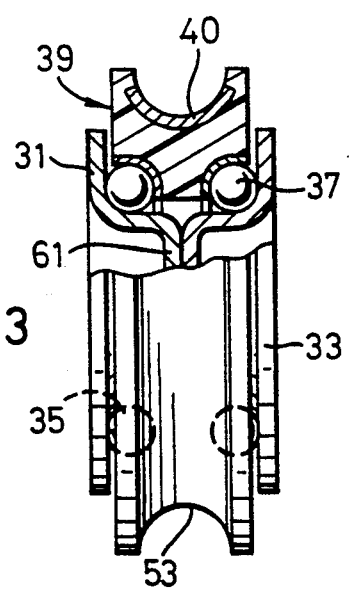
FIG. 3 shows a modification of the roller of FIG. 2.

The wheel assemblies of the present invention which is shown in FIG. 2 and 3 are designed to overcome the above problems.

Referring to FIG. 2, the wheel assembly comprises a carriage made up of side plates 31 and 33, each of which has an aperture therein as in the construction of FIG. 1 but in this case the walls of the plates 31 and 33 defining the aperture are curved inwardly as shown at 32 and 34, so as to provide at the junction between the inturned portion 32 and its plate 31 and at the junction between the inturned portion 34 and its plate 33 respectively internal ball races 43 and 41. These ball races 43 and 41 are actually provided by part of the inner face of the side plates 31 and 33 respectively and the inner faces of the inturned portions 32 and 34, and arcuate portions of the side plates, which means that separate inner ball race parts are not required. A first set of ball bearings 35 is supported by the race 43 and a second set of ball bearings 37 is supported by the race 41.

As in the known construction, a wheel 39 is supported directly by the ball bearings but in this case there are two sets of ball bearings which means that two outer races must be provided on the internal periphery of the wheel 39, one for the one set 35 of ball bearings and the other for the other set 37 of ball bearings. Accordingly, outer races shaped to receive the two sets of ball bearings are provided on the inner peripheral corners of the wheel 39. In the construction shown, the wheel is moulded from a relatively soft material and provided with arcuate internal corner races or grooves 45 and 47 in which annular outer ball race lining shells or tracks 49 and 51 are located, the inner arcuate faces of the shells or tracks 49 and 51 providing the actual outer ball races. The shells 49 are located by internal annular ledges 58 extending upwardly from opposite side faces of the wheel 39, the side walls of a central region 59 of the wheel 39, and arcuate regions 62 connect the respective ledges 58 to the side walls of the central region 59. It will be appreciated, however, that if the wheel 39 is made of a suitable hard material, the races would be provided in the inner periphery corners of the wheel itself.

As in the previous construction, the wheel 39 is provided on its outer periphery with a profile 53 of semicircular cross-section which runs upon a guide rail within a frame for the patio door or the like within which the wheel assembly is mounted.

The assembly is maintained in its illustrated assembled condition by a tubular rivet 55, the outer ends of which are turned over as shown at 57 and bear against the external arcuate faces of the plates 31 and 32 joining their side faces to the outer faces of the inturned portions 32 and 34 of the side plates 31 and 33.

In the construction shown in FIG. 3, in which parts similar to those in FIG. 2 are identified by the same reference numerals, the side plates 31 and 33, instead of being connected together by a tubular rivet, have a central web portion 61 which is formed as an extension of the respective inturned portions 32, 34 (but normal thereto), and these abut and are connected by a simple rivet (not shown). Furthermore, the wheel 39 is provided with a stainless steel tyre 40 which is integrally moulded with the wheel.

The invention can of course be incorporated in both single wheel and double wheel applications.

By using inturned portions of the side plates to provide the inner ball races for two spaced sets of bearings 35 and 37, it is possible to provide a wheel assembly with less component parts and by having two sets of ball bearings rather than one, the wheel 39 is supported both on its inner and its outer faces (i.e. on both sides), thus making a more stable construction. Because there are two sets of ball bearings rather than one, there is less wear and tear and the wheel assembly therefore has a longer life. Furthermore, because the wheel is supported adjacent each side face, it is less susceptible to sideways movement and hence there is also less rocking of the wheel than with prior art constructions. Furthermore, because there are two ball bearing sets rather than one, hardened ball races are not essential, thus permitting the carriage side plates themselves to be used. Furthermore, it is not necessary to use a hardened steel wheel and if desired a moulded wheel can be used which could be formed of synthetic resinous material. Preferably, in this case, however, metal shells and tyres are moulded into the wheel since these are more hard-wearing than the synthetic resinous material itself.

It will of course be understood that the present invention has been described above purely by way of example, and modifications of detail can be made within the scope of the invention.

We claim:

1. A wheel or roller assembly for sliding fenestration, comprising two parallel side plates defining a carriage, a wheel located at least partly between the side plates, and two spaced ball-bearing or roller-bearing sets, one at or adjacent each side of the wheel, rotatably supporting the wheel within the carriage, said side plates each having a side wall an annular inturned portion connected to the side wall, and a central web portion connected to the annular inturned portion, the inturned portion and part of the side wall of each side plate together defining an inner race for a respective one of said bearing sets, means connecting together said central web portions of said side plates, and wherein said wheel has two inner annular edge regions, one on each side thereof to receive one of said bearing sets, and defining an outer race for its bearing set.

2. An assembly according to claim 1 wherein, said web portions abut each other and wherein said means connecting together the two side plates comprises a rivet passing through the web portions.

3. An assembly to claim 2 including a metal tire molded into the outer peripheral surface of the wheel.

4. An assembly according to claim 1 wherein each bearing set is a set of ball bearings, wherein each side plate includes an arcuate portion connecting said inturned portion to its side wall to provide the inner race for its respective ball bearing set, and to confine the ball bearings laterally and prevent them from moving outwards.

5. An assembly according to claim 1 wherein each bearing set is a set of ball bearings, and wherein the wheel includes a central region which extends at least partly between the two bearings sets and confines the ball bearings laterally, preventing them from moving inwards, and also including an internal annular ledge extending inwardly from each side face thereof and forming part of said annular edge region, and two arcuate regions joining the respective internal ledges to the central region.

6. An assembly according to claim 5 wherein the wheel is molded from a synthetic resin.

7. An assembly according to claim 6 including two inserted annular lining shells, one lining each of the outer races of the wheel.

* * * * *

UNITED STATES PATENT AND TRADEMARK OFFICE
CERTIFICATE OF CORRECTION

PATENT NO. : 5,116,142
DATED : May 26, 1992
INVENTOR(S) : John C. Smith, et al

It is certified that error appears in the above-indentified patent and that said Letters Patent is hereby corrected as shown below:

Title page, item [73], Assignee: "Schlegal" should read --Schlegel--.

Signed and Sealed this

Seventh Day of September, 1993

Attest:

BRUCE LEHMAN

Attesting Officer     Commissioner of Patents and Trademarks